(12) United States Patent  
Hodge

(10) Patent No.: US 10,007,062 B2
(45) Date of Patent: Jun. 26, 2018

(54) OPTICAL FIBER ASSEMBLY

(71) Applicant: Molex, LLC, Lisle, IL (US)

(72) Inventor: Malcolm H. Hodge, Chicago, IL (US)

(73) Assignee: Molex, LLC, Lisle, IL (US)

( * ) Notice: Subject to any disclaimer, the term of this patent is extended or adjusted under 35 U.S.C. 154(b) by 0 days. days.

(21) Appl. No.: 14/888,602

(22) PCT Filed: May 1, 2014

(86) PCT No.: PCT/US2014/036337
§ 371 (c)(1),
(2) Date: Nov. 2, 2015

(87) PCT Pub. No.: WO2014/179549
PCT Pub. Date: Nov. 6, 2014

(65) Prior Publication Data
US 2016/0062040 A1    Mar. 3, 2016

Related U.S. Application Data

(60) Provisional application No. 61/818,998, filed on May 3, 2013.

(51) Int. Cl.
G02B 6/36 (2006.01)
G02B 6/25 (2006.01)
G02B 6/38 (2006.01)
G02B 6/26 (2006.01)
G02B 6/32 (2006.01)

(52) U.S. Cl.
CPC .............. G02B 6/25 (2013.01); G02B 6/262 (2013.01); G02B 6/3855 (2013.01); G02B 6/3861 (2013.01); G02B 6/3885 (2013.01); G02B 6/3898 (2013.01); *G02B 6/32* (2013.01)

(58) Field of Classification Search
CPC ....... G02B 6/25; G02B 6/3855; G02B 6/2552
See application file for complete search history.

(56) References Cited

U.S. PATENT DOCUMENTS

| 4,135,781 | A | * | 1/1979 | Archer | G02B 6/3835 |
|  |  |  |  |  | 156/196 |
| 4,191,447 | A | * | 3/1980 | Borsuk | G02B 6/2552 |
|  |  |  |  |  | 29/522.1 |
| 4,510,005 | A | * | 4/1985 | Nijman | B29C 35/0805 |
|  |  |  |  |  | 156/221 |
| 4,545,643 | A |  | 10/1985 | Young et al. |  |
| 4,637,683 | A | * | 1/1987 | Asawa | G02B 6/32 |
|  |  |  |  |  | 356/138 |

(Continued)

FOREIGN PATENT DOCUMENTS

| CN | 1508584 A | 6/2004 |  |
| DE | 4142845 A1 * | 6/1993 | ............. C03B 37/15 |

(Continued)

*Primary Examiner* — Rhonda Peace
(74) *Attorney, Agent, or Firm* — Bo Huang

(57) ABSTRACT

An optical fiber assembly includes a ferrule and a plurality of optical fibers. Each optical fiber has an end portion positioned generally adjacent a front face of the ferrule. The end portion of each optical fiber has an end face for engaging a mating optical component and an enlarged portion with at least a portion thereof engaging the ferrule generally adjacent the front face of the ferrule. A method of fabricating an optical fiber assembly is also disclosed.

26 Claims, 7 Drawing Sheets

(56) References Cited

U.S. PATENT DOCUMENTS

| | | | | |
|---|---|---|---|---|
| 4,695,124 A * | 9/1987 | Himono | G02B 6/3855 | 385/78 |
| 4,743,283 A * | 5/1988 | Borsuk | G02B 6/2552 | 219/121.27 |
| 4,755,203 A * | 7/1988 | Coutts | G02B 6/2552 | 219/121.25 |
| 4,758,386 A * | 7/1988 | Fanning | G02B 6/2552 | 264/1.26 |
| 4,798,431 A * | 1/1989 | Clark | G02B 6/2552 | 385/60 |
| 4,854,663 A * | 8/1989 | Borsuk | G02B 6/2552 | 385/33 |
| 5,097,522 A * | 3/1992 | Tackett | G02B 6/2552 | 385/53 |
| 5,135,590 A * | 8/1992 | Basavanhally | G02B 6/32 | 156/154 |
| 5,633,968 A * | 5/1997 | Sheem | G02B 6/262 | 385/53 |
| 5,772,720 A | 6/1998 | Taira-Griffin et al. | | |
| 5,917,985 A * | 6/1999 | Im | G02B 6/2552 | 385/140 |
| 6,062,740 A * | 5/2000 | Ohtsuka | G02B 6/3833 | 385/77 |
| 6,246,026 B1 * | 6/2001 | Vergeest | B23K 26/0624 | 219/121.72 |
| 6,331,081 B1 * | 12/2001 | Ohtsuka | G02B 6/2552 | 385/51 |
| 6,409,394 B1 * | 6/2002 | Ueda | G02B 6/25 | 385/80 |
| 6,554,488 B2 * | 4/2003 | Asada | G02B 6/25 | 385/60 |
| 6,588,941 B2 * | 7/2003 | Yasuda | G02B 6/2552 | 385/79 |
| 6,768,837 B1 * | 7/2004 | Thual | G02B 6/2552 | 385/115 |
| 6,793,403 B2 * | 9/2004 | Suematsu | B29D 11/0075 | 385/60 |
| 6,816,661 B1 * | 11/2004 | Barnes | G02B 6/3807 | 385/134 |
| 7,040,816 B2 * | 5/2006 | Fujita | G02B 6/4202 | 385/89 |
| 7,116,884 B2 * | 10/2006 | Nakajima | G02B 6/3672 | 385/120 |
| 7,142,741 B2 * | 11/2006 | Osborne | B23K 26/0734 | 385/134 |
| 7,216,512 B2 * | 5/2007 | Danley | B23K 26/0823 | 219/121.72 |
| 7,431,514 B2 * | 10/2008 | Fujiwara | G02B 6/3885 | 385/60 |
| 8,313,249 B2 * | 11/2012 | Gurreri | G01M 11/088 | 385/71 |
| 8,340,485 B2 | 12/2012 | Danley et al. | | |
| 9,563,027 B2 * | 2/2017 | Childers | G02B 6/3831 | 385/134 |
| 2002/0028047 A1 * | 3/2002 | Yasuda | G02B 6/2552 | 385/79 |
| 2004/0047587 A1 | 3/2004 | Osborne | | |
| 2009/0097800 A1 * | 4/2009 | Gurreri | G01M 11/088 | 385/71 |
| 2010/0284651 A1 | 11/2010 | Krahenbuhl et al. | | |
| 2012/0027358 A1 | 2/2012 | Webb et al. | | |
| 2012/0051706 A1 * | 3/2012 | van Geffen | G02B 6/3833 | 385/134 |
| 2012/0263422 A1 | 10/2012 | Lu | | |
| 2016/0062040 A1 * | 3/2016 | Hodge | G02B 6/3855 | 385/80 |

FOREIGN PATENT DOCUMENTS

| | | | | |
|---|---|---|---|---|
| DE | 19840439 A1 * | 3/2000 | | G02B 6/25 |
| EP | 0 580 858 A1 | 2/1994 | | |
| GB | 2179145 A | 2/1987 | | |
| JP | 02-208608 A | 8/1990 | | |
| JP | 08-338930 A | 12/1996 | | |
| JP | 2000-304967 A | 11/2000 | | |
| JP | 2012-083609 A | 4/2012 | | |
| WO | WO 2004/017115 A1 | 2/2004 | | |

\* cited by examiner

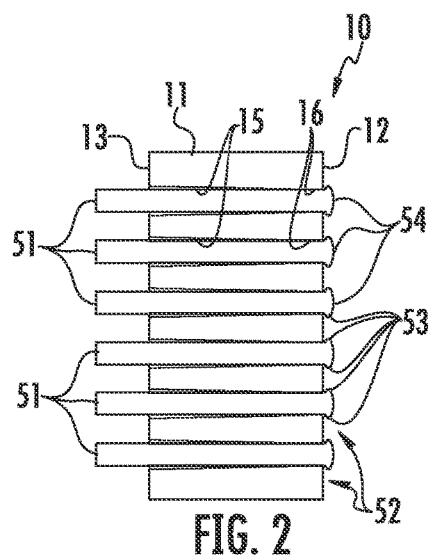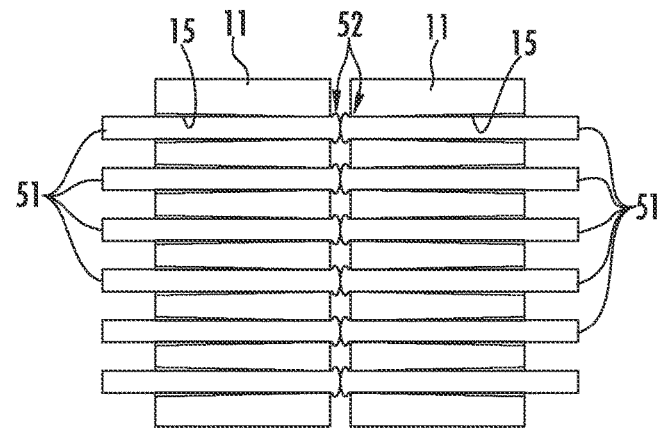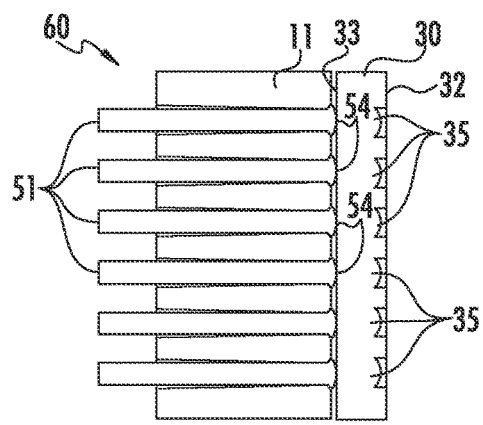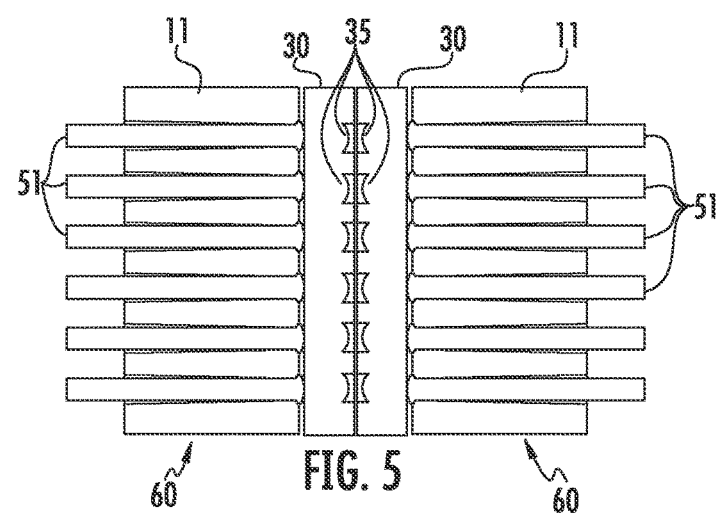

OPTICAL FIBER ASSEMBLY

REFERENCE TO RELATED APPLICATIONS

The Present Disclosure claims priority to prior-filed U.S. Provisional Patent Application No. 61/818,998, entitled "Optical Fiber Assembly," filed on 3 May 2013 with the United States Patent And Trademark Office. The content of the aforementioned Patent Application is incorporated in its entirety herein.

BACKGROUND OF THE PRESENT DISCLOSURE

The Present Disclosure relates, generally, to optical fiber assemblies, and, more particularly, to an optical fiber assembly with laser cleaved optical fibers.

Systems for interconnecting optical fibers typically utilize mating ferrule assemblies to facilitate handling and accurate positioning of the fibers. The optical fibers are secured within a ferrule body with an end surface of each fiber being positioned generally flush with or slightly protruding from an end face of the ferrule body.

During assembly, the optical fibers are typically inserted into a ferrule and then cleaved or cut to a desired length. In use, the end surfaces or faces of each of the optical fibers must be sufficiently smooth, to permit signals in the form of light transmissions to pass through the end faces without any significant degradation or back-reflection of the signals. In addition, it is typically desirable to position the end faces of the optical fibers in a common plane for subsequent mating with another component. In some instances, the end faces may be considered coplanar if they are within one micron of a common plane.

In some instances, the optical fibers may be mechanically cleaved. While mechanical cleaving may result in relatively rough end faces, the end faces are then typically mechanical polished so that they are sufficiently smooth and lie in a common plane. Such mechanical polishing of the optical fibers typically requires costly materials such as polishing paper and/or films and is time consuming. In addition, the process must be carefully monitored to maintain the polishing angle at a right angle to the axes of the optical fibers or the axis of a multi-fiber cable.

Laser cleaving may cleave or cut the optical fibers and produce end faces on the optical fibers that do not require polishing. However, the end faces of laser cleaved optical fibers may not lie in a common plane (i.e., within one µm of a common plane). Laser cleaved end faces may vary in length by 15 µm or more. When using multi-fiber cable, movement of the individual optical fibers to position the end faces in a common plane may be problematic, as movement of one fiber may cause movement of an adjacent fiber. Accordingly, an easily manufactured optical fiber assembly with optical fibers having laser cleaved end faces is desirable.

SUMMARY OF THE PRESENT DISCLOSURE

In one aspect, an optical fiber assembly includes a ferrule and a plurality of optical fibers. The ferrule has a front face and a plurality of bores intersecting with the front face. Each optical fiber has a portion thereof fixed within one of the bores. Each optical fiber may further have an end portion positioned generally adjacent the front face of the ferrule. The end portion of each optical fiber has an end face for engaging a mating optical component and an enlarged portion with at least a portion thereof engaging the ferrule generally adjacent the front face of the ferrule.

In another aspect, a method of fabricating an optical fiber assembly includes providing a ferrule having a front face and a plurality of bores intersecting with the front face. The method further includes inserting an optical fiber into each bore with a portion of each optical fiber extending past the front face of the ferrule. Each optical fiber is laser cleaved to define an end face and an enlarged portion generally adjacent the end face of each optical fiber. The optical fibers are moved relative to the ferrule to move at least a portion of the enlarged portion of each optical fiber into engagement with the ferrule generally adjacent the front face of the ferrule. The optical fibers are then fixed to the ferrule.

In still another aspect, a method of fabricating an optical fiber assembly includes providing a ferrule having a front face and a plurality of bores intersecting with the front face and further providing a tool having a plurality of optical interfaces. The method further includes inserting an optical fiber into each bore with a portion of each optical fiber extending past the front face of the ferrule. Each optical fiber is laser cleaved to define an end face. The method includes aligning the optical interfaces with the optical fibers, providing optical signals to the optical fibers through the optical interfaces, and measuring back-reflection through the optical interfaces while moving at least some of the optical fibers axially relative to the ferrule, and then fixing the optical fibers to the ferrule.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 2 is a simplified, diagrammatic cross-section of a portion of the optical fiber assembly of FIG. 1;

FIG. 3 is a simplified, diagrammatic view of the pair of mating optical fiber assemblies of FIG. 2;

FIG. 4 is a simplified, diagrammatic view of an alternate embodiment of an optical fiber assembly including a lens plate;

FIG. 5 is a simplified, diagrammatic view of the pair of mating optical fiber assemblies of FIG. 2, each having a lens plate thereon;

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
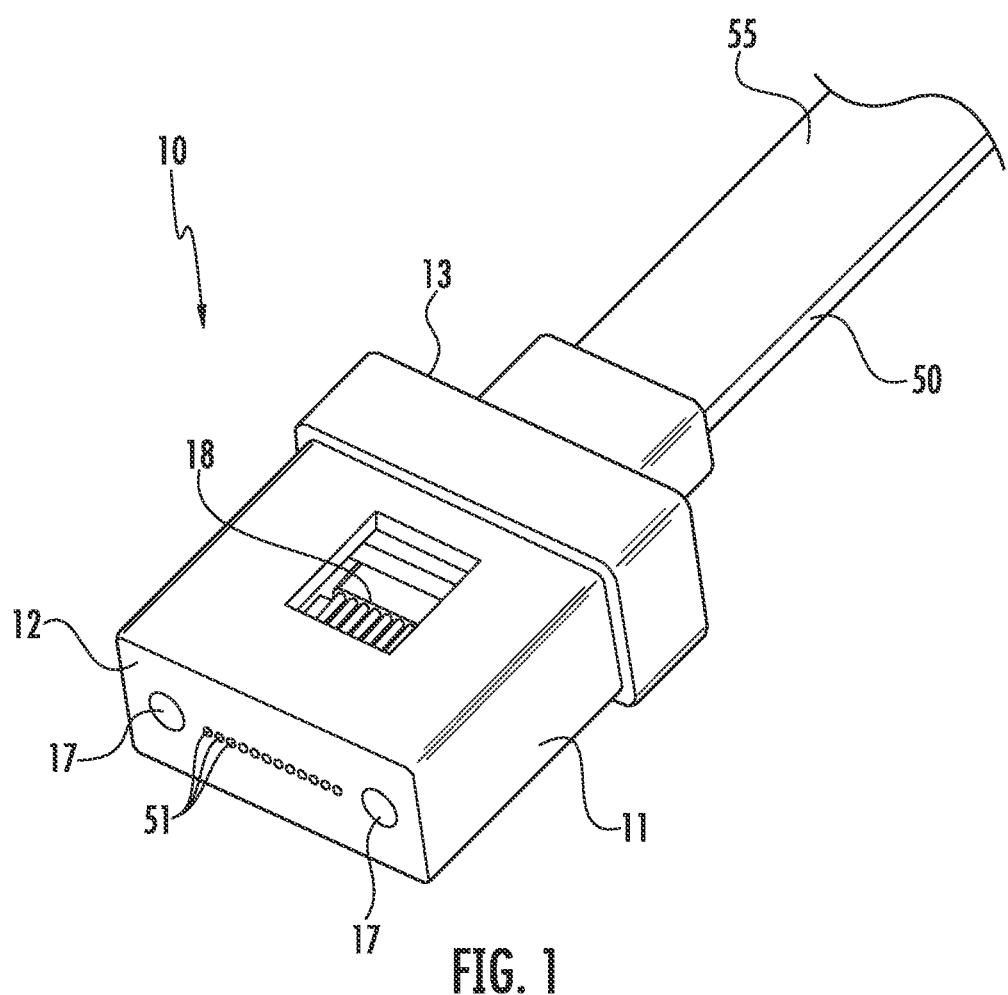
FIG. 1 is a perspective view of an optical fiber assembly according to the Present Disclosure.

Referring to FIGS. 1-2, an optical fiber assembly such as a multi-fiber MT type ferrule assembly 10 is depicted. The ferrule assembly 10 includes a ferrule 11 having a plurality of optical fibers 51 of a multi-fiber cable 50 therein. As depicted, ferrule assembly 10 includes one row of twelve optical fibers 51 although the ferrule assembly may be configured to receive greater or fewer optical fibers if desired. For example, current MT ferrules generally include one to six rows of optical fibers 51 with two to twelve optical fibers per row. Although depicted in conjunction with an MT type ferrule 11, the concepts disclosed herein are applicable for use with any type or configuration of ferrule and with any number of optical fibers 51.

The ferrule 11 is generally rectangular and has a generally flat front face 12 and a generally flat rear face 13. As depicted in FIG. 1, ferrule 11 includes one row of twelve optical fiber receiving holes or bores 15 (FIG. 2) that extend through the ferrule 11 and intersect with the front face 12. The bores 15 may be generally cylindrical or may be tapered to some extent with the smallest portion of the bore at an end portion 16 adjacent the front face 12. Such taper is exaggerated in FIG. 2 for clarity. Ferrule 11 may also include a pair of alignment holes or receptacles 17 positioned on opposite sides of the array of fiber receiving holes 15. Alignment holes 17 may be generally cylindrical and extend between front face 12 and rear face 13. In other embodiments, the holes 17 may have other configurations such as not extending all of the way to rear face 13, not having a uniform cross-section, or having a uniform, non-circular cross-section such as a hexagonal cross-section. The alignment holes 17 are configured to receive therein a post (not shown) from a mating component to facilitate alignment when mating a pair of assemblies. An opening or reservoir 18 may be provided along one surface of the ferrule 11. The reservoir 18 may be in fluid communication with the bores 15 to permit an adhesive to be applied within or at reservoir 18 to secure optical fibers 51 within their respective bores 15.

Ferrule 11 may be formed of a resin capable of being injection molded such as polyphenylene sulphide or polyetherimide and may include an additive such as silica ($SiO_2$) to increase the strength and stability of the resin. Other materials may be used if desired. A portion of each of the optical fibers 51 of multi-fiber cable 50 is positioned within each fiber receiving hole 15 and extends past the front face 12 of the ferrule 11. The end portions 52 of the optical fibers 51 may extend past the front face 12 of the ferrule 11 by as little as 0.20 μm or a greater distance such as 2.00 mm. The distance that the end portions 52 extend past the front face 12 of the ferrule 11 is exaggerated in FIG. 2 for clarity. In one example, the optical fiber 51 may have a diameter of approximately 125 m. Optical fibers 51 may be secured or fixed within the fiber receiving holes 15 by an adhesive such as epoxy.

Referring to FIG. 2, the end portions 52 may also include an enlarged portion 53 having a diameter larger than that of the diameter of the optical fiber 51. In the example in which the optical fiber 51 has a diameter of approximately 125 μm, the enlarged portion 53 may have a cross-section or diameter of approximately 127 μm. Other sizes are also contemplated. In another example, the enlarged portion 53 may have a diameter as small as approximately 125.5 μm or a diameter as large as approximately 130 μm. In still another example, the enlarged portion 53 may have a diameter approximately 1-2% larger than the diameter of the optical fiber 51. The increase in cross-section or diameter of the enlarged portion 53 of the end portions 52 relative to optical fiber 51 is exaggerated in FIG. 2 for clarity.

The end portion 16 of each bore 15 and the enlarged portions 53 of the optical fibers 51 are dimensioned so as to prevent the optical fiber from moving further into the bore 15 due to the enlarged portion 53 of each optical fiber creating an interference fit with the end portion 16 of each bore 15. Although the enlarged portion 53 is sometimes referenced above in terms of a diameter, such feature need not necessarily be round but is a structure having a cross-section larger than the diameter of the optical fiber 51 and is configured to prevent the optical fiber from moving past end portion 16 and into bore 15 more than a desired distance. The structure is configured so as not to adversely affect the light transmission properties of optical fibers 51.

An end face 54 of the end portion 52 of each optical fiber 51 may have a convex or slightly rounded or arcuate shape with the center of the optical fiber 51 extending farther than the outer edges. Such a configuration reduces the likelihood of any recess at the core of the optical fiber or "core dip" and improves the core-to-core contact between mating optical fibers. In the example of FIG. 2 in which the ferrule assembly 10 is configured for physical contact such as through a butt connection with a mating component, the end face 54 of an optical fiber 51 having a diameter of approximately 125 microns may have a convexity equal to or less than approximately 1.0 μm. In other words, the radius of the end face 54 may be equal to or less than approximately 1.0 μm. In some instances, an end face 54 having a larger convexity may be used. In other instances, the end face 54 may be flat.

The end faces 54 of the plurality of optical fibers 51 may be configured to lie in a common plane for mating with optical fibers of a mating ferrule assembly 110 or another mating component. A pair of mating ferrule assemblies are depicted in FIG. 3. In other embodiments, the end faces 54 may be positioned in a non-planar configuration with the optical fibers 51 of the mating ferrule assembly or component being positioned in a complimentary pattern so that the end faces of aligned optical fibers are in physical contact with each other.

In an alternate embodiment depicted in FIG. 4, ferrule assembly 60 may include a lens plate 30 positioned adjacent the front face 12 of ferrule 11 so that a lens element 35 is aligned with each optical fiber 51. Lens plate 30 may be generally rectangular and have a front face 32 and a rear face 33. Lens plate 30 may be formed of an optical grade resin that is capable of being injection molded with a refractive index closely matching that of the optical fibers 51. In other words, the optical fibers 51 have an optical fiber index of refraction and the lens plate 30 has a lens plate index of refraction. It may be desirable to choose a material for the lens plate 30 to set the optical fiber index of refraction and the lens plate index of refraction as approximately equal. An adhesive with an optically matched index of refraction may be used to secure the lens plate 35 to the optical fibers 51.

If desired, the optical fibers 51 of ferrule assembly 60 may be configured to some extent differently than those of ferrule assembly 10. For example, the convexity of the end faces 54 of the optical fibers may be larger such as equal to or less than approximately 5.0 μm. The end faces 54 of the optical fibers 51 may be positioned so that they coincide with the focal point of each lens element 35. In one example, the lens focal point may be positioned generally at the rear face 33 of the lens plate 30. In doing so, the end portions 52 of each optical fiber 51 may be positioned further inside end portions 16 of bores 15 as compared to the embodiment in FIG. 2 so that the end faces 54 are positioned at the lens focal point at the rear face 33 of lens plate 30. If the focal point of the lens elements 35 is positioned at another location relative to lens plate 30, the position of the end faces 54 may be adjusted accordingly to coincide with the lens focal point. A pair of mated lensed ferruled assemblies 60 are depicted in FIG. 5.

A resilient, index-matched medium or insert (not shown) may be positioned between the rear face 33 of the lens plate 30 and the end faces 54 of the optical fibers 51. The resilient insert may be compressed between the front faces 54 of the optical fibers 51 and the rear face 33 of the lens plate 30 to compensate for any variations in co-planarity between the end faces 54 and the rear face 33 and any thermal expansion of the optical fibers 51. The resilient insert 45 may be formed of a resilient material having an index of refraction approximately equal to those of the lens plate 30 and the optical fibers 51. By choosing materials that have approximately equal indices of refraction, transmission losses due to differences between the indices of refraction may be minimized. In one example, the resilient insert 51 may be formed of silicone but, in some applications, other materials such as urethane may also be used.

Figure 6:
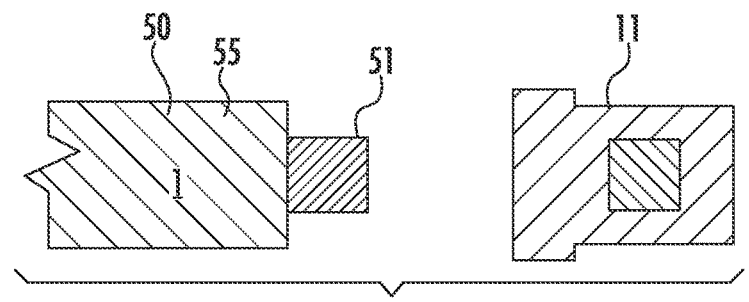
FIG. 6 is a top plan view of a ferrule and a multi-fiber cable.
Figure 7:
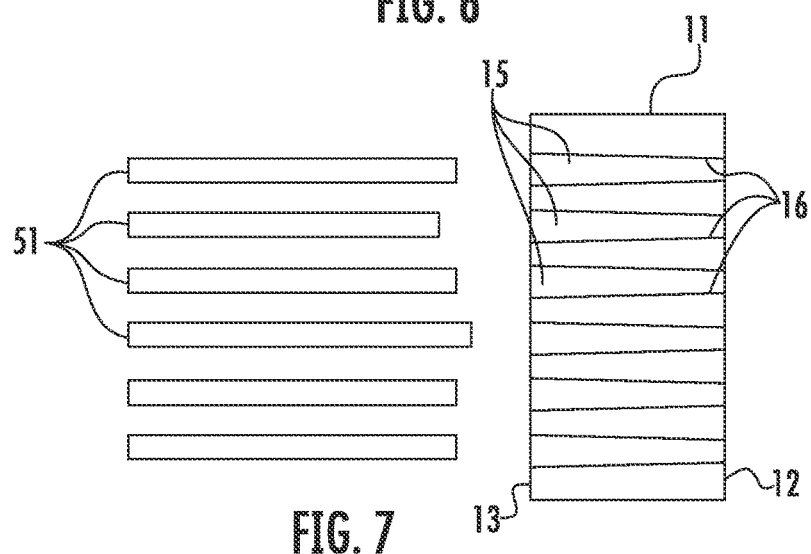
FIG. 7 is a simplified, diagrammatic view of a portion of the ferrule and multi-fiber cable of FIG. 6.
Figure 8:
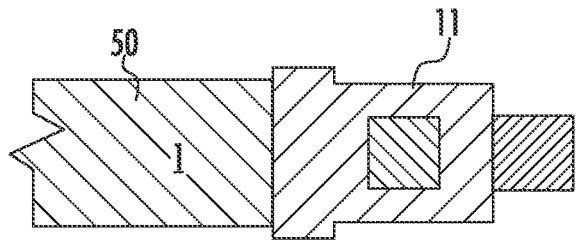
FIG. 8 is a top plan view similar to that of FIG. 6, but with the optical fibers of the multi-fiber cable inserted into the ferrule.
Figure 9:
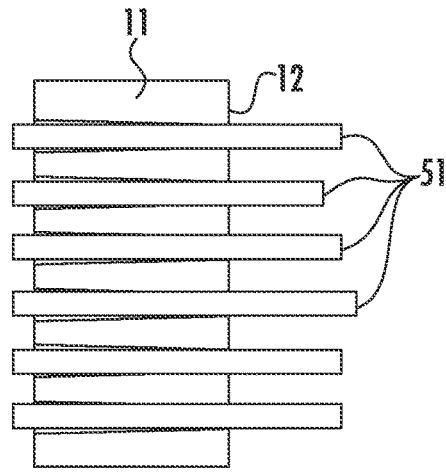
FIG. 9 is a simplified, diagrammatic view of a portion of the ferrule and optical fibers of FIG. 8.

Referring to FIGS. 6-16, a process for mounting optical fibers 51 within ferrule 11 is depicted. In FIGS. 6-7, the outer cover or jacket 55 as well as the buffer (not shown) and other material surrounding the optical fibers 51 of multi-fiber cable 50 have been removed and the optical fibers aligned with bores 15 of ferrule 11. In FIGS. 8-9, a length of each optical fiber 51 is inserted into a bore 15 and extends beyond the front face 12 of ferrule 11. In some instances, it may be desirable for the end face 54 of each optical fiber 51 to extend at least approximately 5 mm past the front face 12 of ferrule 11 so that the front face is not exposed to excessive heat during the process of laser cleaving the optical fibers.

Figure 10:
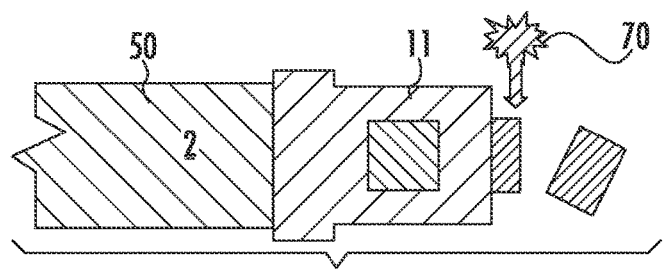
FIG. 10 is a top plan view similar to that of FIG. 8 depicting a laser cleaving process.
Figure 11:
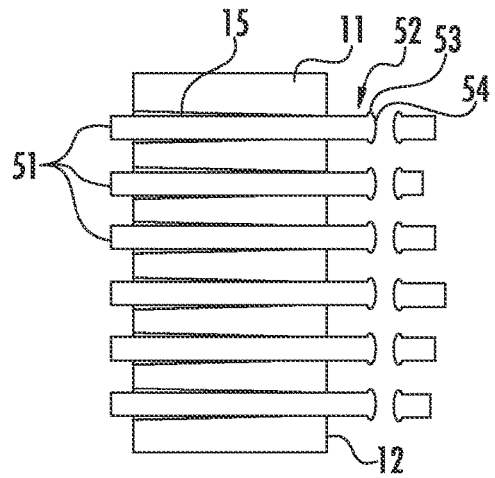
FIG. 11 is a simplified, diagrammatic view of a portion of the ferrule and optical fibers of FIG. 10.

In FIGS. 10-1, a portion of each optical fiber 51 extending through the ferrule 11 may be laser cleaved. In doing so, a laser 70 produces a beam that cuts or cleaves each optical fiber 51 sequentially along each row of optical fibers. In one example, a $CO_2$ laser with a 1.06 μm wavelength may be used. Other lasers may also be used. It is believed that a slight amount of melting of the optical fibers 51 is desirable to create the enlarged portions 53. Adjustment of the process used with the laser may adjust the configuration of enlarged portions 53.

Laser cleaving may produce a very smooth fiber end face so mechanical polishing of the end face 54 of the optical fibers 51 as is normal with mechanical cleaving processes is no longer necessary. Elimination of polishing eliminates a time-consuming task, saves on polishing paper or film and other materials, and eliminates the need for polishing equipment. In addition, polishing alters the physical features of the end face 54 of the optical fibers 51 and thus may affect the angular position of the end face. In the case of a multi-fiber array terminated to a ferrule 11, differences in the angular position of the end faces 54 of the optical fibers 51 may prevent simultaneous physical contact with optical paths of a mating component. Since a laser-cleaved optical fiber 51 does not need to be polished, the angular position of end face 54 is subject to less variation. During the laser cleaving process, the process may be configured such that the end face 54 of each optical fiber 51 is formed with an arcuate or convex shape as described above. The process may also be configured to also or simultaneously form the enlarged portions 53 of the optical fibers 51 rather than merely cleaving the optical fibers. Through such a process, the enlarged portions 53 are integrally formed as a unitary component of the optical fibers 51 at the end portions 52. The power and beam angle of the laser may be adjusted to create an end face 54 that is essentially flat or slightly convex and is orthogonal to the axis of the optical fiber 51 axis and with a relatively small fiber tip enlargement or enlarged portion 53 that has a diameter of approximately 0.5 to 2.0 μm larger than the optical fiber. Enlarged portions 53 of other sizes are also contemplated. Such a configuration may be desirable for butt connections in which any air gap between mated adjacent fiber surfaces exceeding 0.1 μm may lead to exaggerated transmission loss and return loss due to the Fabry-Perot interference that occurs under certain conditions with glass-air interfaces.

When used with lensed applications, the end face 54 may be slightly more convex as the optical fiber 51, the lens plate 30, and any adhesive or other material between the end face and the lens plate will be optically matched. As a result, the power and beam angle of the laser may be adjusted to provide a more convex end face with a convexity of up to approximately 5 μm. In some applications the convexity may be up to approximately 10 μm or more. The process may result in an enlarged portion 53 having a diameter of approximately 0.5-5.0 μm larger than the optical fiber. Enlarged portions 53 of other sizes are also contemplated.

Figure 12:
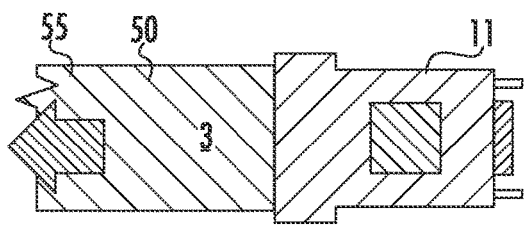
FIG. 12 is a top plan view of the ferrule and multi-fiber cable with the optical fibers moved rearwardly relative to the ferrule.
Figure 16:
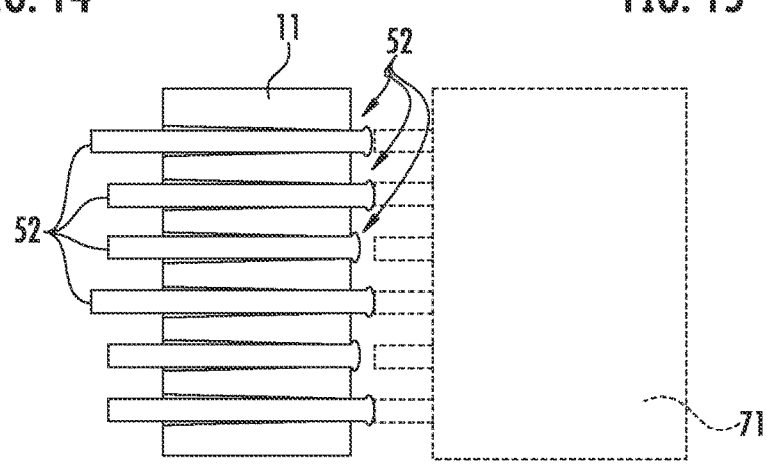
FIG. 16 is a view similar to FIG. 15, together with a tool for further moving some of the optical fibers rearwardly relative to the ferrule.

Once the optical fibers 51 have been cleaved and the enlarged portions 53 formed, the optical fibers are moved rearwardly relative to the front face 12 of ferrule 11, as depicted in FIGS. 12-3. In one example, the optical fibers 51 may be pulled or drawn rearward such as by pulling on the jacket 55 of multi-fiber cable 50. In another example, the optical fibers 51 may be moved rearward by pressing against the end faces 54 with an appropriate tool depicted in phantom at 71 (FIG. 16). Each optical fiber 51 may move rearward until its enlarged portion 53 engages the end portion 16 of its respective bore 15 due to the larger diameter of the enlarged portion.

The enlarged portions 53 provide the advantage of resisting to some extent the relative rearward movement of optical fiber 51 within bores 15. The optical fiber 51 may be formed of a material, such as glass, that is somewhat softer than the material from which the ferrule 11 is formed. As a result, by increasing the force applied to the optical fibers 51, the enlarged portions 53 may deform somewhat and the optical fibers 51 may be forced into the bore 15 despite the presence of the enlarged portion. As a result, even if the enlarged portions 53 of the optical fibers 51 are not coplanar, the optical fibers may be moved relative to the ferrule 11 to form an interference or abutting fit therewith, and the end faces 54 are positioned in a coplanar manner.

Figure 13:
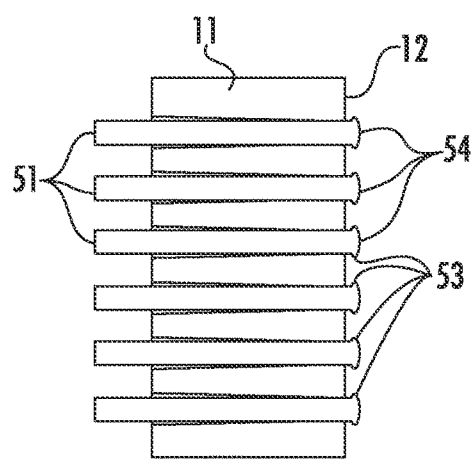
FIG. 13 is a simplified, diagrammatic view of the ferrule and optical fibers of FIG. 12.
Figure 14:
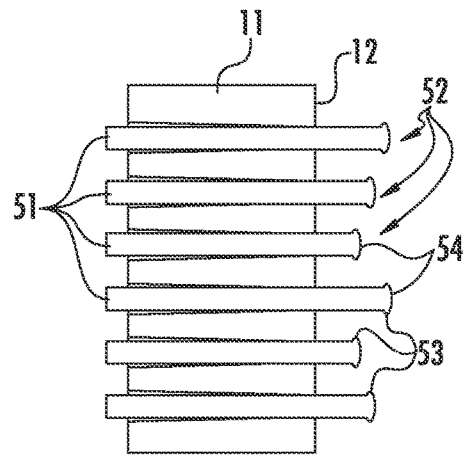
FIG. 14 is a view similar to that of FIG. 11, but with the end faces of the optical fibers depicted in an exaggerated, staggered configuration.
Figure 15:
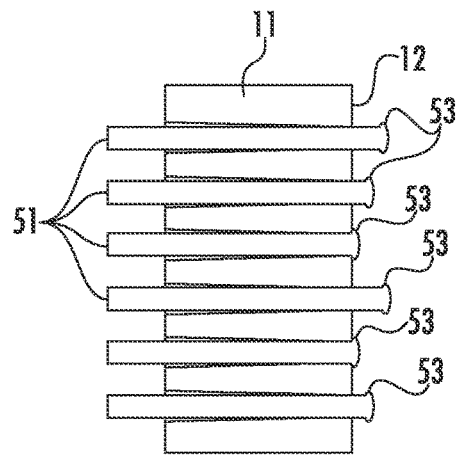
FIG. 15 is a view similar to that of FIG. 14, with the optical fibers moved rearward relative to the ferrule and the enlarged portions of some of the optical fibers engaging the front face of the ferrule.

Moving the optical fibers 51 rearward relative to ferrule 11 either by pulling or drawing the multi-fiber cable 50 or by pushing on the end faces 54 of the optical fibers 51 will tend to move the optical fibers together as a group. Movement of each optical fiber will generally stop when the enlarged portion 53 of its end portion 52 engages the end portion 16 of its respective bore 15. However, when laser cleaving a plurality of optical fibers 51, the end faces 54 of the optical fibers of each multi-fiber cable 50 may vary by as much as fifteen μm or more. Such variance is exaggerated in FIGS. 14-6 for clarity. As a result, as depicted in FIG. 15, upon moving cable 50 rearward relative to ferrule 11, some of the enlarged portions 53 will engage the front face 12 of ferrule 11 while others are still spaced from the front face. A force may be applied to the end faces 54 of those optical fibers 51 whose enlarged portions 53 are still spaced from the front face 12 by tool 71 as depicted in FIG. 16. The engagement between the tool 71 and the optical fibers 51 whose enlarged portions 53 are spaced from the ferrule 11 will cause those optical fibers to continue to move rearward, relative to the ferrule 11 due to flexibility within the cable 50, until all of the enlarged portions 53 of the optical fibers engage the front face 12 of ferrule 11 and the end faces are coplanar as depicted in FIG. 13. In other words, the optical fibers 51 may move independently to some extent due to flexibility in cable 50 so that some but not all of the optical fibers may move axially until the enlarged portions 53 of all of the optical fibers engage the front face 12 of ferrule 11. As a result, the longer optical fibers 51 may move rearwardly a greater distance than the shorter optical fibers to account for differences in length between the optical fibers caused by tolerances in the laser cleaving process. Through such a configuration, greater coplanarity of the end faces 54 may be achieved.

Figure 17:
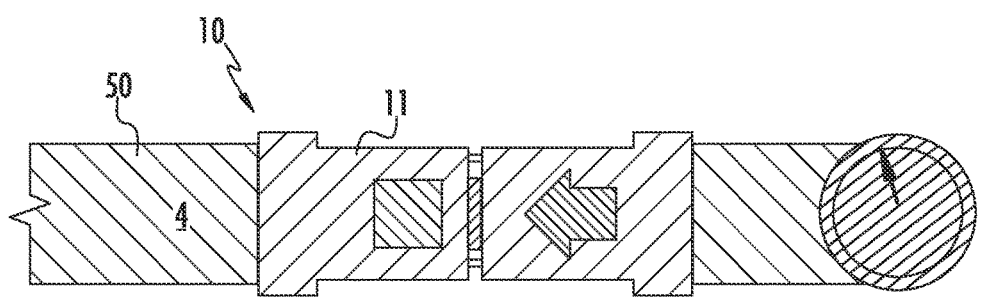
FIG. 17 is a top plan view of a ferrule and multi-fiber cable together with an active alignment fixture.
Figure 18:
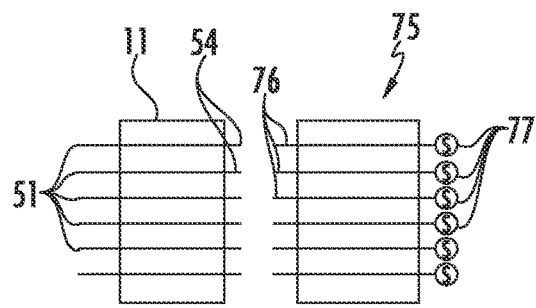
FIG. 18 is a simplified, diagrammatic view of the ferrule and multi-fiber cable and the active alignment fixture of FIG. 17.
Figure 19:
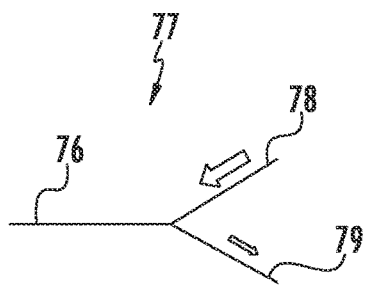
FIG. 19 is a schematic view of a splitter of the active alignment fixture.

If desired, axial or z-axis alignment of the plurality of optical fibers 51 relative to front face 12 of ferrule 11 may be actively achieved. As depicted in FIGS. 17-8, an active alignment fixture or tool 75 may be provided that includes a plurality of optical fiber interfaces 76 configured to mate with the end face 54 of each optical fiber 51 of ferrule assembly 10. A splitter 77 (FIG. 19) may be provided to permit an optical signal to be provided or injected into each optical path along a first leg 78 and also measure any back-reflection along the second leg 79. The tool 75 may be configured as an ideal or "golden" jumper in which the optical interfaces 76 are perfectly orthogonal and coplanar so that any back-reflection is a measure of the alignment of the optical fibers 51 within ferrule 11.

When performing an active alignment process, each of the optical fibers 51 are moved rearward relative to ferrule 11. While moving the optical fibers 51 or after some or all of the optical fibers have engaged the end portion 16 of the bores 15 of the ferrule 11, the optical interfaces 76 of the tool 75 may engage the end faces 54 of the optical fibers. A signal may be provided or injected along the first leg 78 of the splitter 78 from a known source. Back-reflection may be measured along the second leg 79 and compared to the input signal.

If any end face 54 of the optical fibers 51 are not in contact with a respective optical interface of the tool 75, a relatively large back-reflection will be measured in second leg 79. The tool 75 may then be moved towards the front face 12 of ferrule 11. Only those optical fibers 51 in contact with the optical interfaces 76 will also be moved by tool 75. As the tool 75 continues to move, any of the optical interfaces 76 that were spaced from the end faces 54 of the optical fibers 51 will eventually engage one of the optical fibers. After the optical interfaces 76 engage the end face 54 of each optical fiber 51, the back-reflection of each optical fiber will be reduced below a predetermined value to signify that the end faces lie in a common plane. In other words, the tool 75 may be used to move at least some of the optical fibers 51 axially relative to ferrule 11 to adjust the axial position of some of the optical fibers 51 within bores 15 during the measurement process. Once the enlarged portion 53 of the end portion 52 of an optical fiber 51 engages the respective end portion 16 of bore 15, the amount of axial movement of the optical fiber may be somewhat limited. However, as described above, the enlarged portions 53 of some or all of the optical fibers 51 may deform and permit the optical fibers to be further inserted into their respective bores 15. Through such an active alignment process, the end faces 54 of the optical fibers 51 may be positioned in a common plane. In some circumstances, the active alignment process disclosed herein may be used with optical fibers 51 that do not have enlarged portions 53.

Regardless whether the optical fibers 51 are actively or passively aligned, once the end faces 54 are positioned as desired, an adhesive may be used to secure the optical fibers 51 in place relative to the ferrule 11. In some instances, it may be desirable to secure or "tack" the optical fibers 51 in place using a first adhesive immediately upon completion of the positioning process and then use a subsequent process to secure the optical fibers in a permanent manner.

Figure 20:
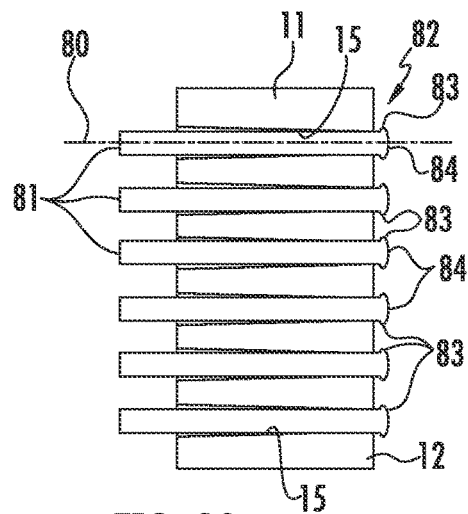
FIG. 20 is a simplified, diagrammatic view of a portion of an optical fiber assembly with the end portions of the optical fibers configured according to an alternate embodiment.
Figure 21:
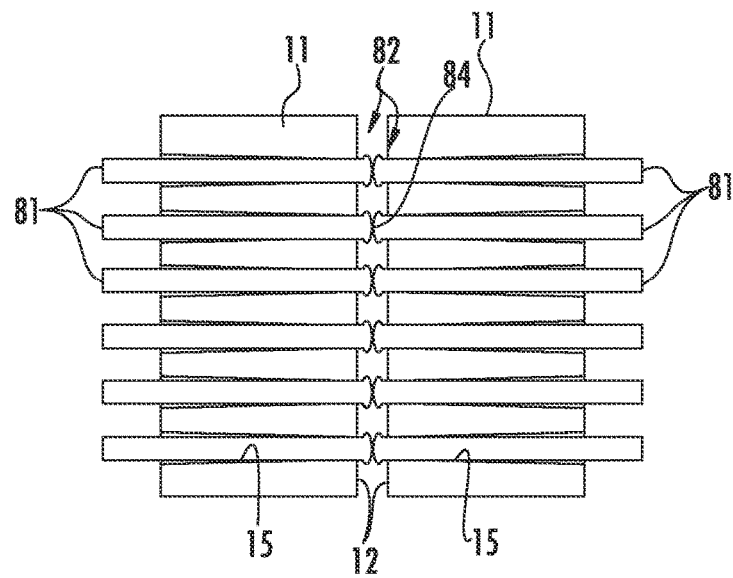
FIG. 21 is a simplified, diagrammatic view of a pair of mating optical fiber assemblies according to the alternate embodiment of FIG. 20.

Referring to FIG. 20, in an alternate embodiment, rather than cleaving the optical fibers in a manner perpendicular to the axes of the optical fibers, the laser 70 and the optical fibers 81 may be configured to cleave the optical fibers at an angle to the axes 80 of the optical fibers. Such angled cleaving will create an end portion 82 having an enlarged portion 83 at an angle to the axis of the optical fiber and an angled end face 84. In an example used for single mode optical fibers, the angle may be approximately 8° while an angle of approximately 15° may be used with multi-mode optical fibers. As depicted in FIG. 21, the end faces 84 of mating optical fibers are oriented in an opposite manner so as to achieve a desired butt contact.

As the optical fibers 81 are moved rearward relative to the front face 12 of the ferrule 11 during assembly, the rearward portions or edges 85 of the enlarged portions 83 (i.e., the portions closest to the front face) will contact the front face before the forward portions or edges 86 of the enlarged portions (i.e., the portions farthest from the front face). The uneven or angled contact between the front face 12 of the ferrule 11 and the enlarged portions 83 of the optical fibers 81 may cause the end portions 82 of the optical fibers to deflect from their respective optical axes 80. In some circumstances, the deflection of the end portions 82 may decrease the alignment of the cores of the optical fibers and thus reduce the quality of the interface between the end faces 84 of pairs of mating optical fibers. It is believed that the smaller the enlarged portion 83, the less likely that any deflection may occur. If desired, a portion of the bore 15 of the ferrule 11 adjacent the front face 12 may be recessed with a shape (not shown) complimentary to that of the angled enlarged portion 83 so that the enlarged portion engages the ferrule along an entire circumferential surface of the enlarged portion. By engaging the ferrule along the entire circumferential surface of the enlarged portion, non-uniform forces between the enlarged portion 83 and the ferrule 11 may be eliminated or reduced. By maintaining uniform forces along the enlarged portions 83, the end portion 82 of the optical fibers 81 are less likely to deflect during positioning within the ferrule 11.

Figure 22:
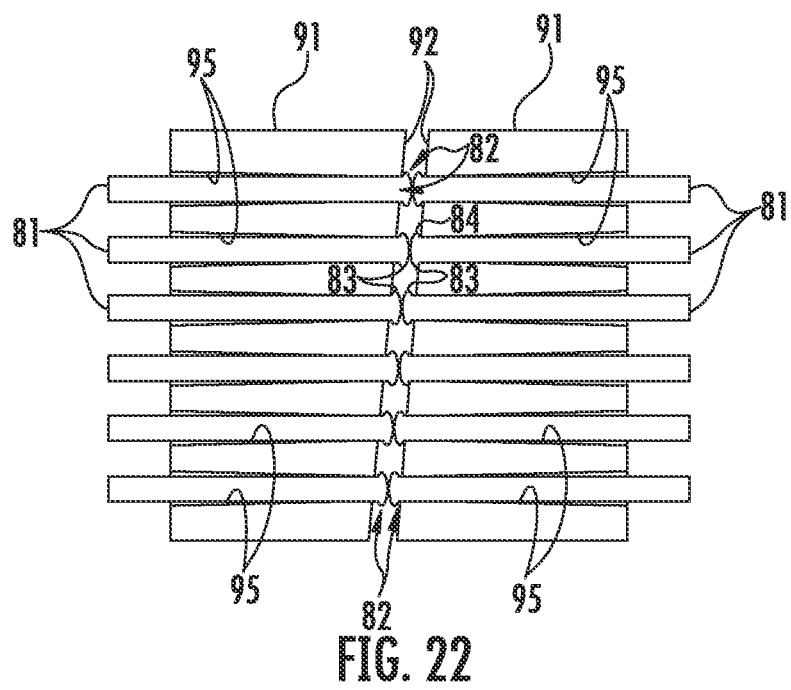
FIG. 22 is a simplified, diagrammatic view of a pair of mating optical fiber assemblies similar to FIG. 21, but with the ferrules configured according to an alternate embodiment.

In another embodiment depicted in FIG. 22, the ferrule 91 may be configured with an angled front face 92 and a plurality of bores 95 extending into the front face. The angle of the front face 92 may match the angle of the enlarged portions 83 so that the enlarged portions engage the ferrule along an entire circumferential surface of the enlarged portion. By engaging the ferrule along the entire circumferential surface of the enlarged portion, uniform forces between the enlarged portions 83 and the angled front face 92 may be maintained. As stated above, the end portions 82 of the optical fibers 81 are less likely to deflect during positioning within the ferrule 11 if uniform forces are maintained along the enlarged portions 83.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber assembly comprising:
   a ferrule, the ferrule having a front face and a plurality of bores intersecting with the front face, wherein at least one bore of the plurality of bores is tapered with a smallest portion of the at least one bore being at a bore end portion adjacent the front face; and
   a plurality of optical fibers, each optical fiber having a portion thereof fixed within one of the bores and an end portion positioned generally adjacent the front face, the end portion having an end face for engaging a mating optical component and an enlarged portion with at least a portion thereof engaging the ferrule generally adjacent the front face, wherein the end face is formed by a laser sequentially cleaving each optical fiber and the enlarged portion is formed by the laser melting part of the end face during the cleaving, wherein the optical fibers have a fiber diameter, and wherein the enlarged portions of the optical fibers have a diameter larger than the fiber diameter.

2. The optical fiber assembly of claim 1, wherein the end face of each optical fiber extends at least to the front face.

3. The optical fiber assembly of claim 1, wherein each end face is generally convex.

4. The optical fiber assembly of claim 1, wherein each end face is in a common plane.

5. The optical fiber assembly of claim 1, wherein the enlarged portion is a unitary component of the optical fiber.

6. The optical fiber assembly of claim 1, wherein the enlarged portion and the end face of each optical fiber are generally parallel.

7. The optical fiber assembly of claim 1, wherein the enlarged portion and each end face are disposed at an angle to an axis of the optical fiber.

8. The optical fiber assembly of claim 7, wherein the enlarged portion of each optical fiber engages the ferrule along only a portion of the enlarged portion.

9. The optical fiber assembly of claim 7, wherein the enlarged portion of each optical fiber engages the ferrule along an entire circumferential surface of the enlarged portion.

10. The optical fiber assembly of claim 1, wherein the ferrule includes an opening in fluid communication with the bores, and the optical fibers are retained within the bores at least in part by an adhesive positioned within the opening.

11. A method of fabricating an optical fiber assembly, the method comprising:
    providing a ferrule, the ferrule having a front face and a plurality of bores intersecting with the front face;
    inserting an optical fiber into each bore, a portion of each optical fiber extending past the front face;
    laser sequentially cleaving each optical fiber along the portion extending past the front face to define an end face and an enlarged portion generally adjacent the end face, wherein the enlarged portion is formed by a laser melting part of the end face during the laser cleaving;
    moving the optical fibers relative to the ferrule to move at least a portion of the enlarged portion of each optical fiber into engagement with the ferrule generally adjacent the front face; and
    fixing the optical fibers to the ferrule.

12. The method of claim 11, wherein the laser cleaving step includes forming the end face of each optical fiber with a generally convex surface.

13. The method of claim 11, further including the step of integrally forming the enlarged portion as a unitary component of each optical fiber.

14. The method of claim 11, wherein the laser cleaving step includes forming the enlarged portion and the end face to be generally parallel.

15. The method of claim 14, wherein the moving step includes moving only a portion of the enlarged portion into engagement with the ferrule.

16. The method of claim 14, wherein the moving step includes moving an entire circumferential portion of the enlarged portion into engagement with the ferrule.

17. The method of claim 11, wherein the laser cleaving step includes forming the enlarged portion and the end face at an angle to an axis of the optical fiber.

18. The method of claim 11, wherein the moving step includes positioning the end face in a common plane.

19. The method of claim 11, further including the step of providing a plurality of optical interfaces.

20. The method of claim 19, further including the step of providing optical signals to the optical fibers through the optical interfaces.

21. The method of claim 20, further including the step of measuring back-reflection through the optical interfaces while moving at least some of the optical fibers relative to the ferrule.

22. The method of claim 11, further including the step of providing a tool having a plurality of optical interfaces.

23. The method of claim 22, further including the step of aligning the optical interfaces with the optical fibers.

24. The method of claim 23, further including the step of providing optical signals to the optical fibers through the optical interfaces.

25. The method of claim 24, further including the step of measuring back-reflection through the optical interfaces while moving at least some of the optical fibers relative to the ferrule.

26. A method of fabricating an optical fiber assembly, the method comprising:
  providing a ferrule having a front face and a plurality of bores intersecting with the front face, wherein at least one bore of the plurality of bores is tapered with a constant taper angle across an entire length of the at least one bore;
  inserting an optical fiber into each bore, a portion of each optical fiber extending past the front face;
  laser sequentially cleaving each optical fiber along the portion extending past the front face to define an end face and an enlarged portion generally adjacent the end face, wherein the enlarged portion is formed by a laser melting part of the end face during the laser cleaving;
  providing a tool having a plurality of coplanar optical interfaces;
  aligning the optical interfaces with the optical fibers;
  providing optical signals to the optical fibers through the optical interfaces;
  measuring back-reflection through the optical interfaces while moving at least some of the optical fibers axially relative to the ferrule; and
  fixing the optical fibers to the ferrule when the back reflection signals indicate intimate contact between all fibers and their respective coplanar interfaces.

\* \* \* \* \*